(12) United States Patent
Kageyama et al.

(10) Patent No.: US 7,403,616 B2
(45) Date of Patent: Jul. 22, 2008

(54) ELECTRONIC APPARATUS, DATA RECORDING METHOD FOR THE ELECTRONIC APPARATUS, AND STORAGE MEDIUM STORING PROGRAM FOR EXECUTING THE DATA RECORDING METHOD

(75) Inventors: Takahisa Kageyama, Hamamatsu (JP); Yoshinori Kawase, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 793 days.

(21) Appl. No.: 09/922,076

(22) Filed: Aug. 2, 2001

(65) Prior Publication Data

US 2002/0015495 A1 Feb. 7, 2002

(30) Foreign Application Priority Data

Aug. 4, 2000 (JP) ............................ 2000-237623

(51) Int. Cl.
*H04N 7/167* (2006.01)
*H04N 7/16* (2006.01)
*H04L 9/00* (2006.01)
*G11B 15/04* (2006.01)
*G11B 19/04* (2006.01)
*G06F 3/00* (2006.01)

(52) U.S. Cl. ...................... 380/201; 705/57; 705/59; 360/60; 369/84; 369/85; 715/741

(58) Field of Classification Search ................ 380/201; 705/57, 59; 360/60; 369/84–85; 715/741
See application file for complete search history.

(56) References Cited

U.S. PATENT DOCUMENTS 5,155,827 A * 10/1992 Ghering .................... 713/200
5,563,946 A * 10/1996 Cooper et al. ................ 705/56
5,953,529 A * 9/1999 Kato ......................... 717/135
6,034,832 A * 3/2000 Ichimura et al. ............. 360/60
6,067,622 A * 5/2000 Moore ........................ 726/31
6,104,678 A 8/2000 Matsumoto
6,195,129 B1 * 2/2001 Ogino et al. ................ 348/469
6,433,946 B2 8/2002 Ogino (Continued)

FOREIGN PATENT DOCUMENTS

EP 0855837 A2 7/1998

(Continued)

*Primary Examiner*—Minh Dieu Nguyen
(74) *Attorney, Agent, or Firm*—Morrison & Foerster LLP

(57) ABSTRACT

There is provided an electronic apparatus which once makes a user conscious of copyright and the like of digital data, such as audio data and image data, when the user records the digital data or performs the like processing, and then allows the user to use the digital data without annoying him any longer concerning the copyright and the like of digital data, a data recording method for the electronic apparatus, and a storage medium storing a program for executing the data recording method. The electronic apparatus is capable of performing a plurality of processes including a specific process execution of which is restricted in advance. A notification section notifies a user of a message calling the user's attention to the specific process in response to an instruction issued on the specific process. A function-setting section sets a specific function according to the notification of the message. An execution restriction-removal section removes restriction on the execution of the specific process and stops the function of the notification section, based on the set specific function.

7 Claims, 16 Drawing Sheets

U.S. PATENT DOCUMENTS

| | | |
|---|---|---|
| 6,449,425 B1 | 9/2002 | Ogino |
| 6,490,686 B1 * | 12/2002 | Wheeler .................... 713/200 |
| 6,523,117 B2 | 2/2003 | Oki et al. |
| 6,542,870 B1 | 4/2003 | Matsumoto |
| 6,687,802 B1 * | 2/2004 | Kori et al. ................... 711/163 |
| 6,744,588 B2 * | 6/2004 | Sugiyama et al. ............. 360/69 |
| 6,810,200 B1 * | 10/2004 | Aoyama et al. ............... 386/94 |

FOREIGN PATENT DOCUMENTS

| | | |
|---|---|---|
| GB | 2326969 A | 1/1999 |
| JP | 08-036806 | 2/1996 |
| JP | 09-034841 | 2/1997 |
| JP | 10-106167 | 4/1998 |
| JP | 10-210436 | 8/1998 |
| JP | 11-025603 | 1/1999 |
| JP | 11-185388 | 7/1999 |
| JP | 2000-076789 | 3/2000 |
| JP | 2000-163854 | 6/2000 |
| JP | 2000-200475 | 7/2000 |
| JP | 2000-2015106 | 8/2000 |

* cited by examiner

FIG. 6

DATA CREATED BY OTHERS
SHOULD BE USED
ONLY FOR PRIVATE USE.

[CANCEL] [NEXT]

FIG. 7

BE CAREFUL
NOT TO INFRINGE ON COPYRIGHT
BY RECORDING DATA.

[BACK] [OK]

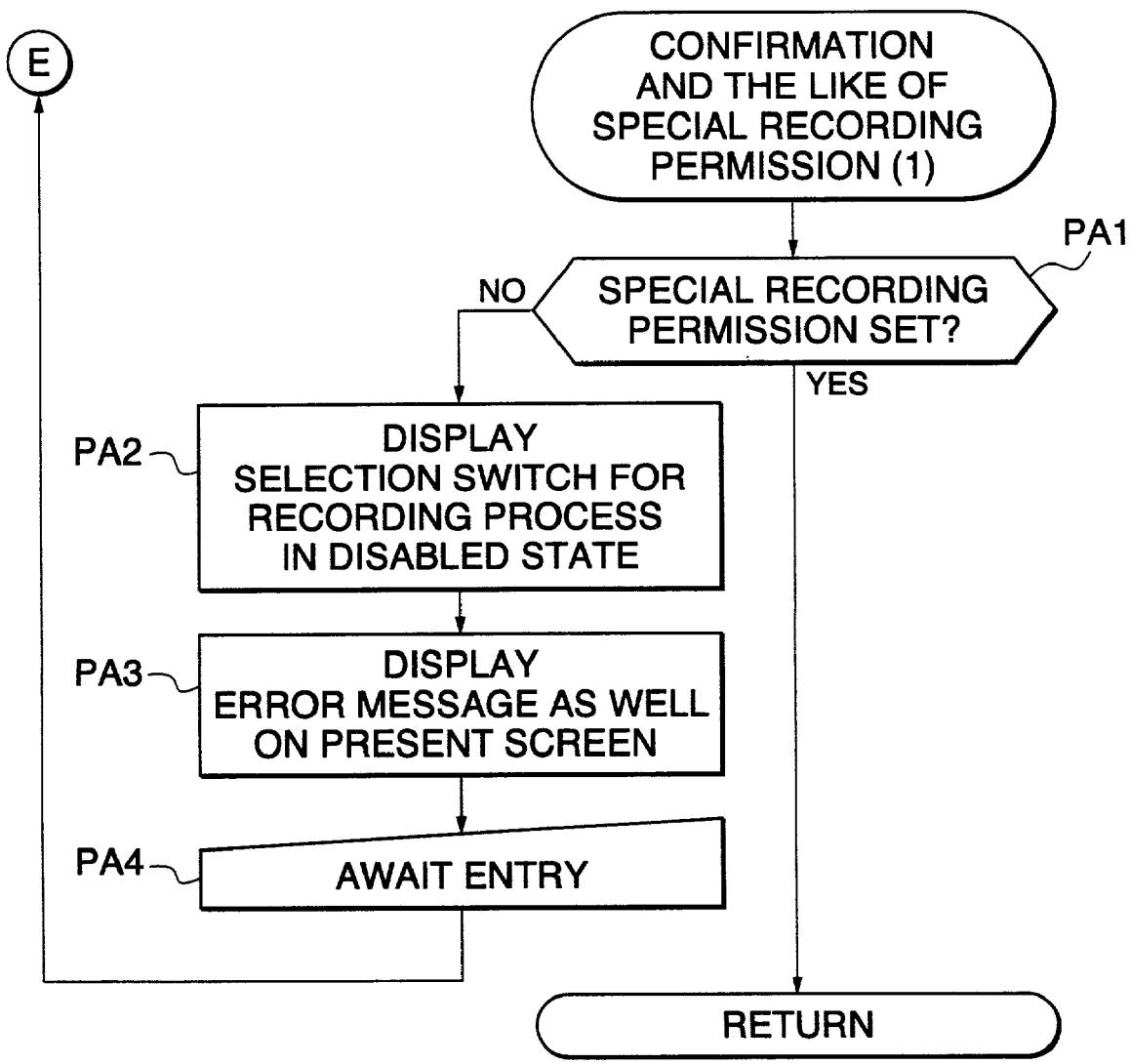

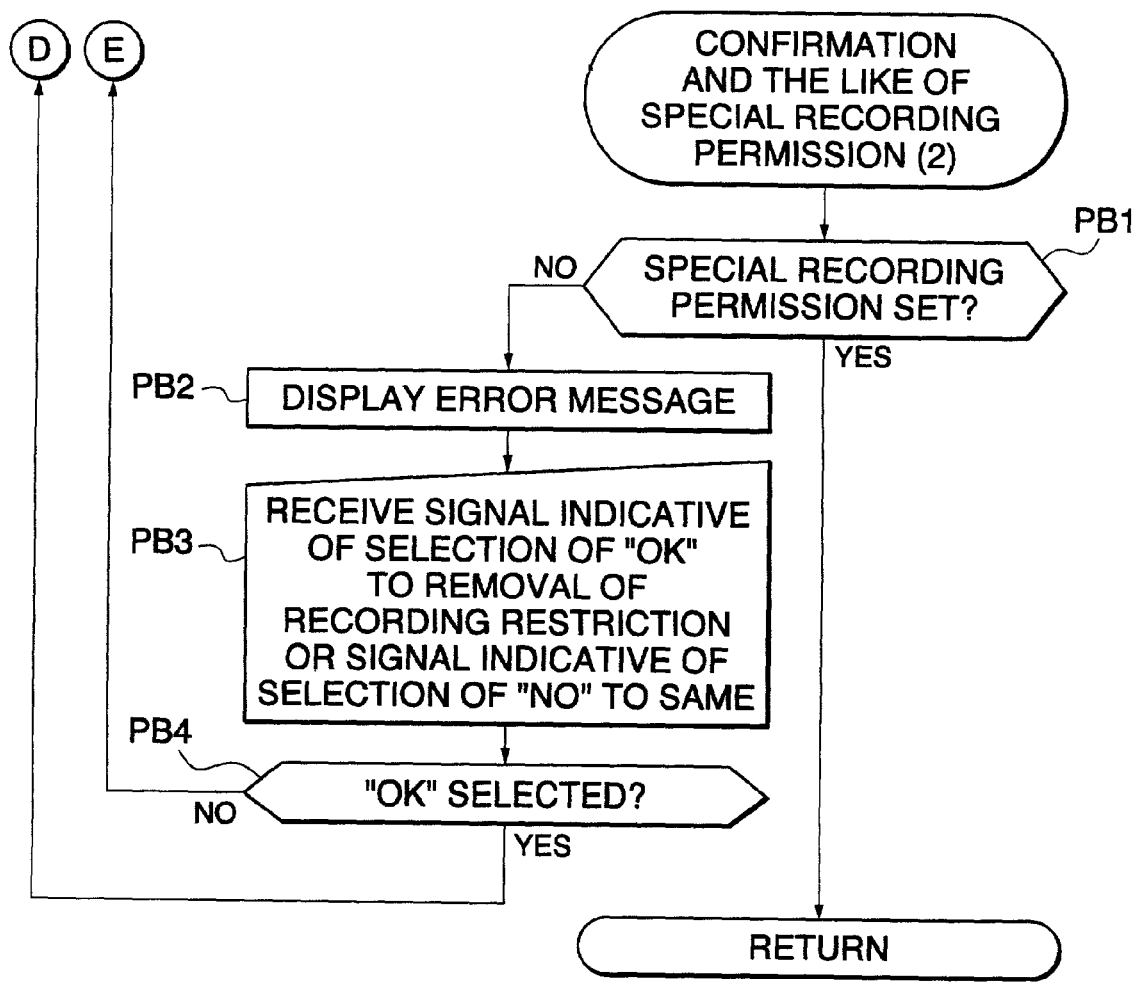

FIG. 10

```
CONFIRMATION
AND THE LIKE OF
SPECIAL RECORDING
PERMISSION (3)
      |
      | PROCEED WITH
      | RECORDING SCREEN
      | IN FIRST RECORDING
      | MODE (A) MAINTAINED
      ↓
   RETURN
```

FIG. 11

DATA FOR RECORDING CONTAINS DATA
UNDER COPYRIGHT PROTECTION.
HOWEVER, IF THE DATA IS COPIED
EXCLUSIVELY FOR PRIVATE USE,
YOU ARE ALLOWED TO RECORD IT
BY PROPERLY SETTING THIS APPARATUS.
DO YOU WANT TO CARRY OUT
THE SETTING RIGHT NOW?

[ YES ]    [ NO ]

ELECTRONIC APPARATUS, DATA RECORDING METHOD FOR THE ELECTRONIC APPARATUS, AND STORAGE MEDIUM STORING PROGRAM FOR EXECUTING THE DATA RECORDING METHOD

BACKGROUND OF THE INVENTION

1. Field of the Invention

This invention relates to an electronic apparatus, and more particularly to an electronic apparatus that deals with digital data, such as audio data and image data, a data recording method for the electronic apparatus, and a storage medium storing a program for executing the data recording method.

2. Prior Art

Conventionally, a method of preventing unauthorized duplication of audio digital data, such as performance data, is employed in which a duplication-inhibiting flag is set in advance to an unassigned bit of data which is not necessary for processing the audio digital data, e.g. in playback of the performance data, and when an apparatus that deals with the digital data detects such a duplication-inhibiting flag set in performance data to be processed, the recording function (sound data recording, image data recording, etc.) of the apparatus is disabled or limited so as to inhibit the duplication of the data.

This function of inhibiting duplication is provided for preventing a user ignorant of the importance of copyright from performing unauthorized duplication of data and transferring the duplicate to a third person or appropriating part (or all) of another person's work for the user's own work without proper authorization.

However, not all acts associated with duplication of works are prohibited, and duplication of a work for a user's private pleasure is not regarded as an illegal act. Therefore, it raises a problem to place excessive restriction on acts of good users who understand the importance of copyright and perform duplication of data within a duly limited scope.

To avoid such a problem, apparatuses have come into use which have a function of giving a warning to a user whenever the user issues an instruction for copying data. Although the apparatuses caution users as to copying of data, they give the same user the same warning in the same situation. However, in spite of understanding the importance of copyright and taking heed thereof, if a user is given the same warning repeatedly as he becomes accustomed to the use of such an apparatus, he cannot help feeling the cautioning message pesky or bothersome. Further, the operation for clearing the warning message before each copying operation is troublesome, and causes a has beente of time and labor.

SUMMARY OF THE INVENTION

It is an object of the present invention to provide an electronic apparatus which once makes a user conscious of copyright and the like of digital data, such as audio data and image data, when the user records the digital data or performs the like processing, and then allows the user to use the digital data without annoying him any longer concerning the copyright and the like of digital data, a data recording method for the electronic apparatus, and a storage medium storing a program for executing the data recording method.

To attain the above object, according to a first aspect of the present invention, there is provided an electronic apparatus that is capable of performing a plurality of processes including a specific process execution of which is restricted in advance, the electronic apparatus comprising a notification section that notifies a user of a message calling the user's attention to the specific process in response to an instruction issued on the specific process, a function-setting section that sets a specific function according to the notification of the message, and an execution restriction-removal section that removes restriction on the execution of the specific process and stops the function of the notification section, based on the set specific function.

The electronic apparatus according to the first aspect of the present invention is capable of performing a plurality of processes on data, such as capturing, writing, and reproduction. These processes include a specific process execution of which is restricted in advance, such as a recording process carried out between digital devices, e.g. for recording digital data stored in a recording medium, such as a CD (compact disk) in a storage device, such as a hard disk provided in the electronic apparatus ("CD-HD recording process" in a preferred embodiment described hereinafter).

According to the electronic apparatus of the first aspect of the present invention, when an instruction on the specific process is given by the user, a message calling the user's attention concerning the specific process is notified to the user, and through notification of this message, the setting of the special function, called "specific recording permission" in the preferred embodiment of the present invention, is enabled. When the specific recording is set, according to the set specific function, the restriction on the execution of the specific process is removed, and at the same time, the function of the notification section is disabled. Therefore, once the user's consciousness of handling of the digital data to be subjected to the specific process is confirmed, and even when the specific function is subsequently set, the message is no longer notified to the user, so that the user need not do the above confirming operation concerning the specific process again.

Preferably, the electronic apparatus further includes a setting information storage device that stores information indicative of the setting of the set specific function, and a recording section that stores the information in the setting information storage device.

According to this preferred embodiment, the information indicative of the setting of the specific function is stored in the storage device, such as a hard disk. That is, when the information indicative of the setting of the specific function is stored in the storage device, from then on, the setting of disabling the function of notification of the message is made active as an initial setting of the electronic apparatus. Therefore, once the user confirms the message, unless the storage device of the electronic apparatus is replaced by another, the nuisance of the message being displayed whenever execution of the specific process is instructed can be avoided.

Preferably, the electronic apparatus includes a data storage device that stores the digital data, and wherein the specific process includes storing digital audio data or image data taken in from an outside of the electronic apparatus in the data storage device.

According to this preferred embodiment, the specific process includes storing digital audio data or image data (music data, such as performance data, speech data, movie data, etc.) taken in from a recording medium, such as a CD, in the data storage device.

Preferably, the notification section displays the message, in dependence on a kind of digital data on which the specific process is to be carried out.

According to this preferred embodiment, the notification of the message is carried out in response to a user's instruction for execution of the specific process based on the "kind of digital data", i.e. depending on whether the data contains an unauthorized duplication-inhibiting identifier, and the restriction on the specific function can be enabled in dependence on the kind of digital data being handled. For example, the electronic apparatus may be configured such that in digital recording of audio data from an audio CD, the presence of the unauthorized duplication-inhibiting identifier is detected, and if the identifier is detected, the user is notified of the message calling his attention. It should be noted that the "kind of digital data" is determined not only from the data containing the unauthorized duplication-inhibiting identifier, mentioned above as an example, but also based on whether the data contains a specific classifying flag, data is in a specific format, the data is stored in a specific medium or received via specific communication means, the data is of a specific genre (audio, image, etc.), and so forth.

Preferably, the notification section displays a message concerning a copyright on a screen or notifies the message by voice, in response to an instruction for executing the specific process or an instruction for setting the specific function.

According to this preferred embodiment, when the user instructs the execution of the specific process or setting of the specific function, a message, such as a precaution concerning a copyright (e.g. for acknowledgement of a copyright and taking heed thereof), is displayed or notified. Therefore, once the user's consciousness of the importance of a copyright of digital data the user is about to use, such as audio data (performance data, speech data) and image data, his acknowledgement of the copyright and intention of taking heed thereof are confirmed, no confirmation-demanding message is displayed any longer, and the user is prevented from being annoyed by the message. It should be noted that the user can be notified of the message by an image displayed on the screen view, speech, or a combination of the image and the speech.

More preferably, the recording section stores the information indicative of the setting of the specific function in the storage device, in response to an instruction for storing the information.

According to this preferred embodiment, the information indicative of the setting of the specific function is stored in the storage device, in response to an instruction given by the user for storing the information. That is, when the confirmation is made on the setting of the specific function upon notification of the message, the information indicative of the setting is not automatically stored in the storage device (it is only stored in a RAM, but not stored in a hard disk), but stored in the storage device (hard disk) only in response to a user's operation for instructing the storing of the information.

Further, the electronic apparatus according to the preferred embodiment can be configured such that the setting of the specific function is executed after the notification of the message, and in response to the user's confirming operation (operation of an "OK" button in the preferred embodiment described hereinafter), whereby once the user's consciousness of handling of the digital data to be subjected to the specific process is confirmed, the notification of the message is no longer carried out, so that the user need not carry out any longer the confirming operation concerning the specific process. Further, the user can use digital data comfortably since he is no longer prompted to perform the confirming operation.

Further, the electronic apparatus according to the preferred embodiment can be configured such that to complete the setting of the specific function, a plurality of confirming operations are required. For example, the message is announced by image in two or more pages or by voice in two or more stages, and the user is required to carry out two or more inputting operations (operating a "NEXT" button and an "OK" button, in the preferred embodiment described hereinafter), to complete the setting of the specific function to thereby remove the restriction on the specific process. This makes it possible to remove the restriction on the execution of the specific process or omit the notification of the message, after the user going through such elaborate confirming operations.

Further preferably, the storage device and the data storage device are an identical storage device that can be replaced.

According to this preferred embodiment, the storage device and the data storage device are an identical storage device that the user can replace by another, such as a hard disk provided in the electronic apparatus, and therefore, the information indicative of the setting of the specific function can be stored in a manner correlated to the digital data stored in the identical storage device (recording medium).

To attain the above object, according to a second aspect of the present invention, there is provided a data recording method for an electronic apparatus that is capable of performing a plurality of processes including a specific process execution of which is restricted in advance, the data recording method comprising the steps of notifying a user of a message calling the user's attention to the specific process in response to an instruction issued on the specific process, setting a specific function according to the notification of the message, and removing restriction on the execution of the specific process and stopping the function of the notification section, based on the set specific function.

According to this data recording method, the same advantageous effects as provided by the electronic apparatus according to the first aspect of the present invention can be obtained.

To attain the above object, according to a third aspect of the present invention, there is provided a computer-readable storage medium storing a program for executing the data recording method according to the second aspect of the present invention.

According to this data recording method, the same advantageous effects as provided by the electronic apparatus according to the first aspect of the present invention and the data recording method according to the second aspect of the present invention can be obtained.

The above and other objects, features, and advantages of the present invention will become more apparent from the following detailed description taken in conjunction with the accompanying drawings.

BRIEF DESCRIPTION OF THE DRAWINGS

FIG. 6 shows an example of a screen view displaying a first page of a message given by the FIG. 1 electronic apparatus;

FIG. 7 shows an example of a screen view displaying a second page of the message given by the FIG. 1 electronic apparatus;

FIG. 8 shows a first example (1) of a flow of a process for confirmation and the like of special recording permission, which is executed by the FIG. 1 electronic apparatus;

FIG. 9 shows a second example (2) of the flow of the process for confirmation and the like of special recording permission;

FIG. 10 shows a third example (3) of the flow of the process for confirmation and the like of special recording permission;

FIG. 11 shows an example of a screen for confirmation of the special recording permission;

DETAILED DESCRIPTION OF PREFERRED EMBODIMENTS

The present invention will now be described in detail with reference to the drawings showing a preferred embodiment thereof.

[System Configuration]

Figure 1:
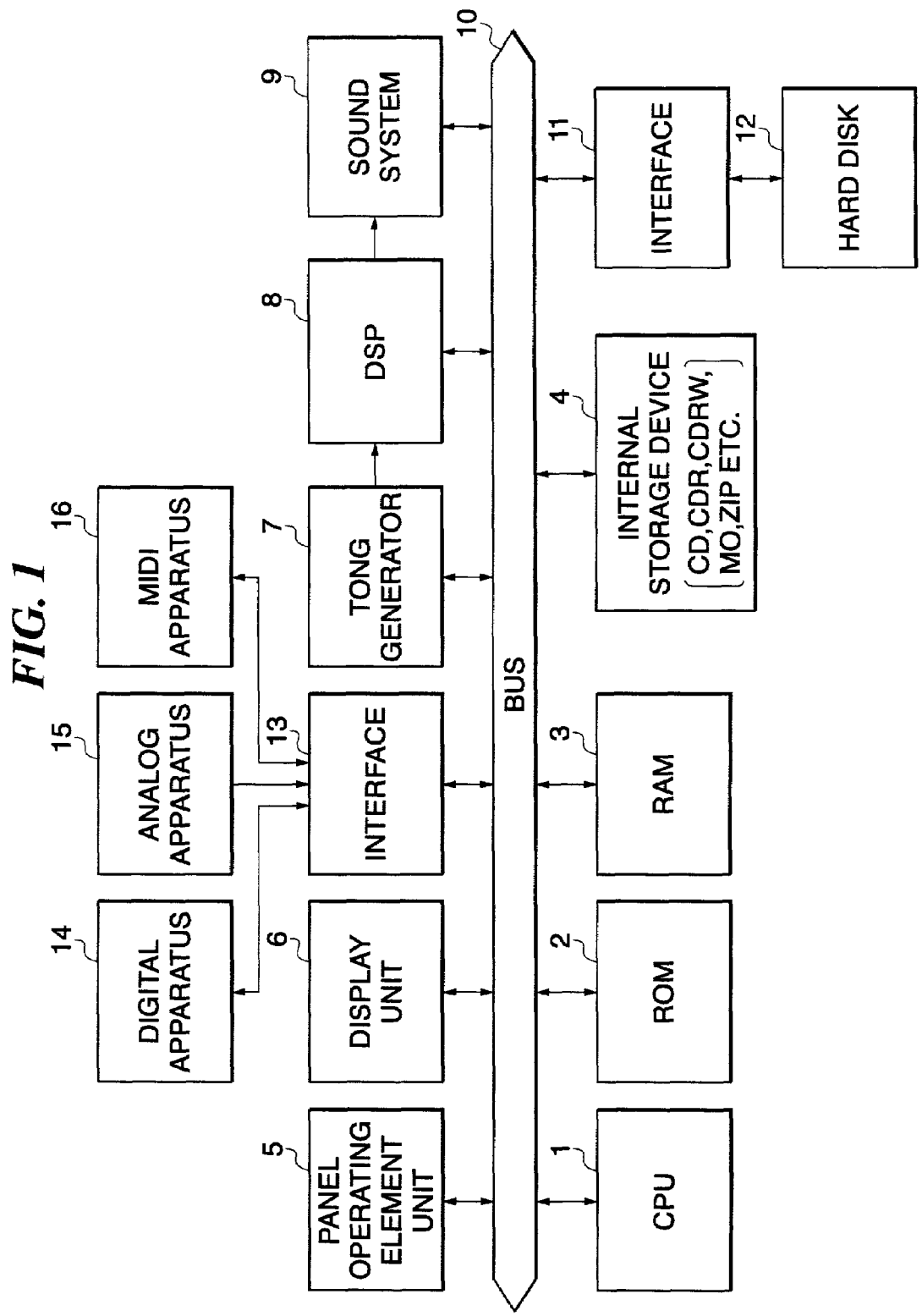
FIG. 1 is a block diagram showing a system configuration of an electronic apparatus according to an embodiment of the present invention.

Referring first to FIG. 1, there is shown the hardware configuration of an electronic apparatus according to an embodiment of the present invention. The system is comprised of a central processing unit (CPU) 1, a read only memory (ROM) 2, a random access memory (RAM) 3, an internal storage device 4, a panel operating element unit 5, a display unit 6, a tone generator 7, a digital signal processor (DSP) 8, and a sound system 9, all of which are interconnected via a bus 10. Further, a hard disk device 12 can be connected to the bus 10 via an interface 11, and a digital apparatus 14, an analog apparatus 15 and a MIDI apparatus 16 can be connected to the bus 10 via an interface 13.

The CPU 1 that controls the whole system basically performs various digital processes on music data, such as capturing, editing, mixing, recording and reproduction, according to predetermined control programs, and is particularly capable of performing various processes concerning recording of digital data, which are included in a so-called panel-setting process. The ROM 2 stores the control programs and various kinds of tables and data for controlling the system, while the RAM 3 is used as a work area for temporarily storing data and parameters required for execution of the above processes.

As the internal storage device 4, there may be used not only drives for a CD, a CD-R (Compact Disk-Recordable), a CD-RW (Compact Disk-ReWritable) and other compact disk-type recording media, but also recording medium drives, such as a magneto-optical (MO) disk drive, a Zip drive, a digital versatile disk (DVD) drive and so forth. The internal storage device 4 is capable of capturing digital data from the recording media or writing digital data into the recording media (except the CD).

The panel operating element unit 5 is comprised of operating elements, such as switches and a dial, for operation by a user in entering various kinds of information into the system. The operating elements include a pointing device such as a mouse. The display unit 6 includes a display, such as a liquid crystal display (LCD), and various kinds of indicators. On the display are displayed a cursor and switch buttons which can be operated by the pointing device or other operating elements.

The tone generator 7, the DSP 8 and the sound system 9 (including speakers) generate musical tones from digital music data obtained through various processes, such as capturing from the outside, editing, mixing and recording. Further, the digital music data can be recorded from the RAM 3 into a recording medium, such as a CD-R in the internal storage device 4, or recorded in the hard disk device 12 via the interface 11. It should be noted that in the present embodiment, the hard disk device 12 has a hard disk removably mounted therein by a slot-in system using an exclusive tray.

The digital apparatus 14 connected to the system via the interface 13 includes not only a host computer for transmitting/receiving various information to/from the system, but also digital source apparatuses such as a CD (including CD-R and CD-RW) player, a DVD player and a DAT (Digital Audio Tape) player. The system can take in digital music data from the host computer and the digital source apparatuses. The analog apparatus 15 includes a microphone for recording live performance musical tones from musical instruments and/or speech, and other analog data output devices, and the MIDI apparatus 16 includes an electronic musical instrument and an electronic tone generator which output MIDI music data.

Figure 2:
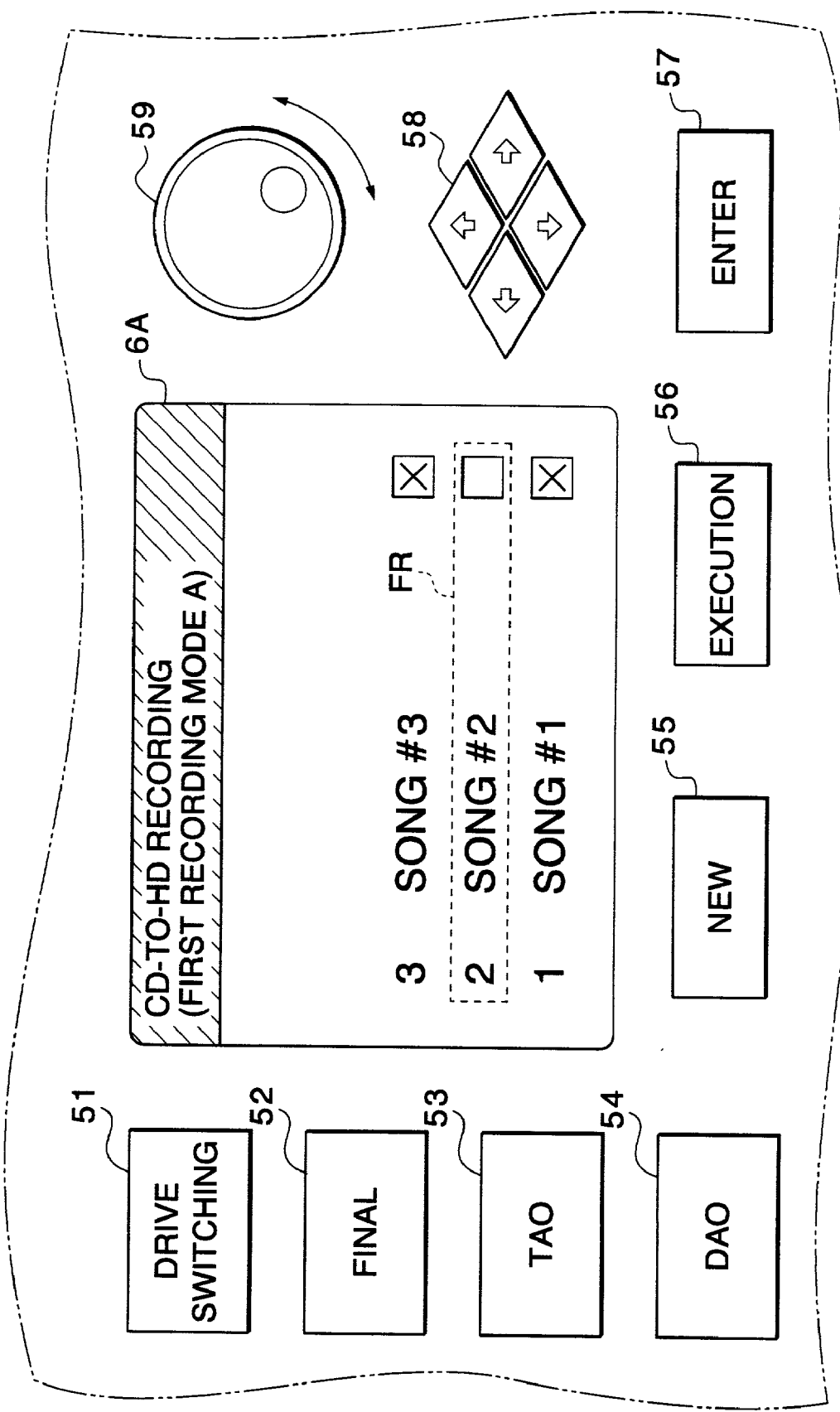
FIG. 2 is an example (part) of the layout of a front panel of the FIG. 1 electronic apparatus.

FIG. 2 shows an example (part) of the layout of the front panel of the electronic apparatus according to the present embodiment. As shown in the figure, the front panel includes not only various kinds of operating elements of the panel operating element unit 5 but also a display (e.g. an LCD) 6A of the display unit 6. In the illustrated example, the panel operating elements include a "DRIVE SWITCHING" switch 51, a "FINAL" switch 52 for use in finishing (finalizing) digital data written in a writable compact disk or the like, such that the digital data can be reproduced by a commercially available CD player, a "TAO" switch 53 which is operated in recording digital data in a track-at-once (TAO) mode which allows additional recording, a "DAO" switch 54 which is operated in writing new digital data and then finishing the same into a finalized state in a disk-at-once (DAO) mode, a "NEW" key switch 55, an "EXECUTION" switch 56, an "ENTRY" key switch 57, a cursor switch 58 comprised of four cursor keys (up arrow key, down arrow key, left arrow key and right arrow key), and a data change dial 59.

[Panel-setting Process]

Figure 3:
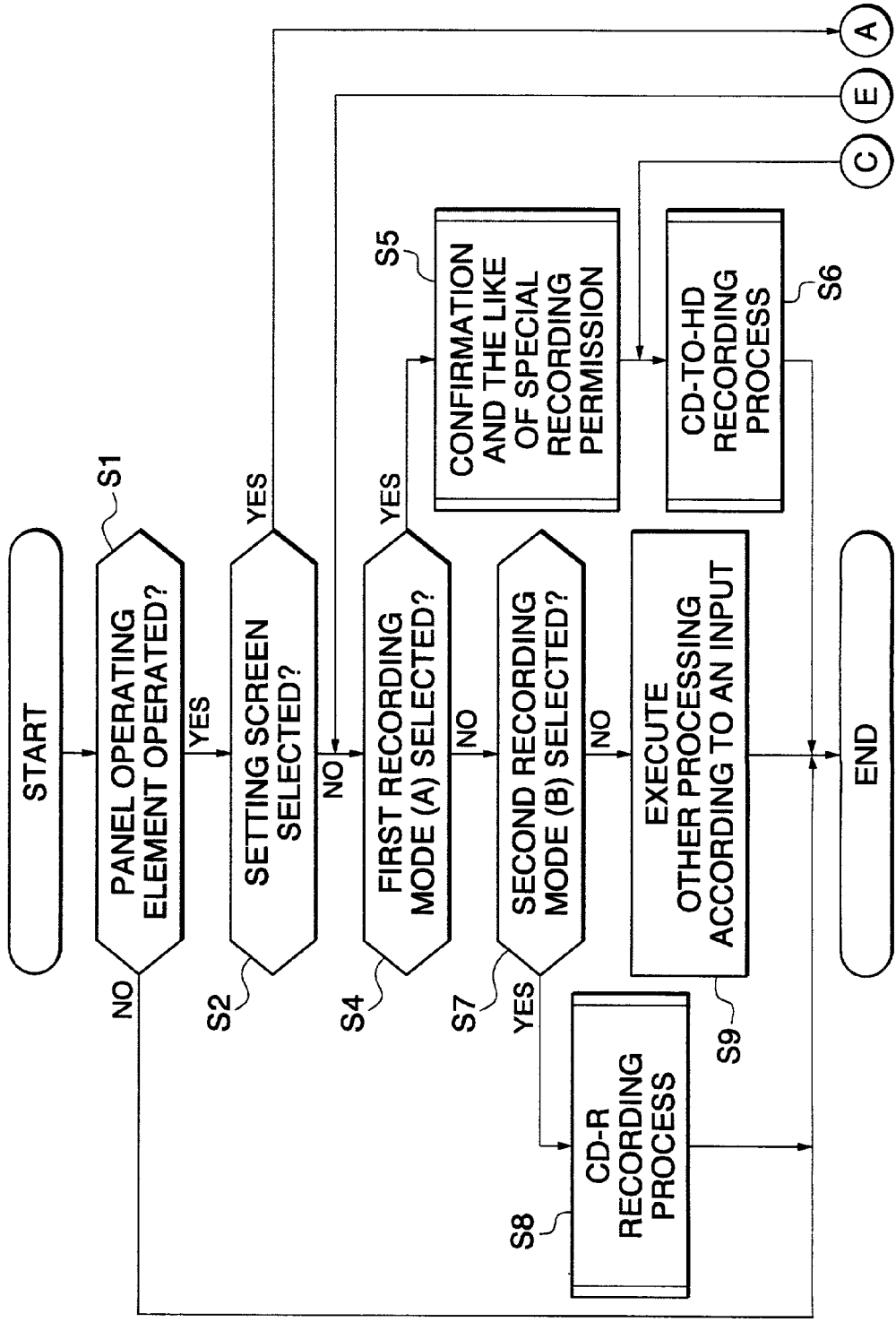
FIG. 3 is a first part (1/3) of a flowchart showing a routine of a panel-setting process which is executed by the FIG. 1 electronic apparatus.
Figure 4:
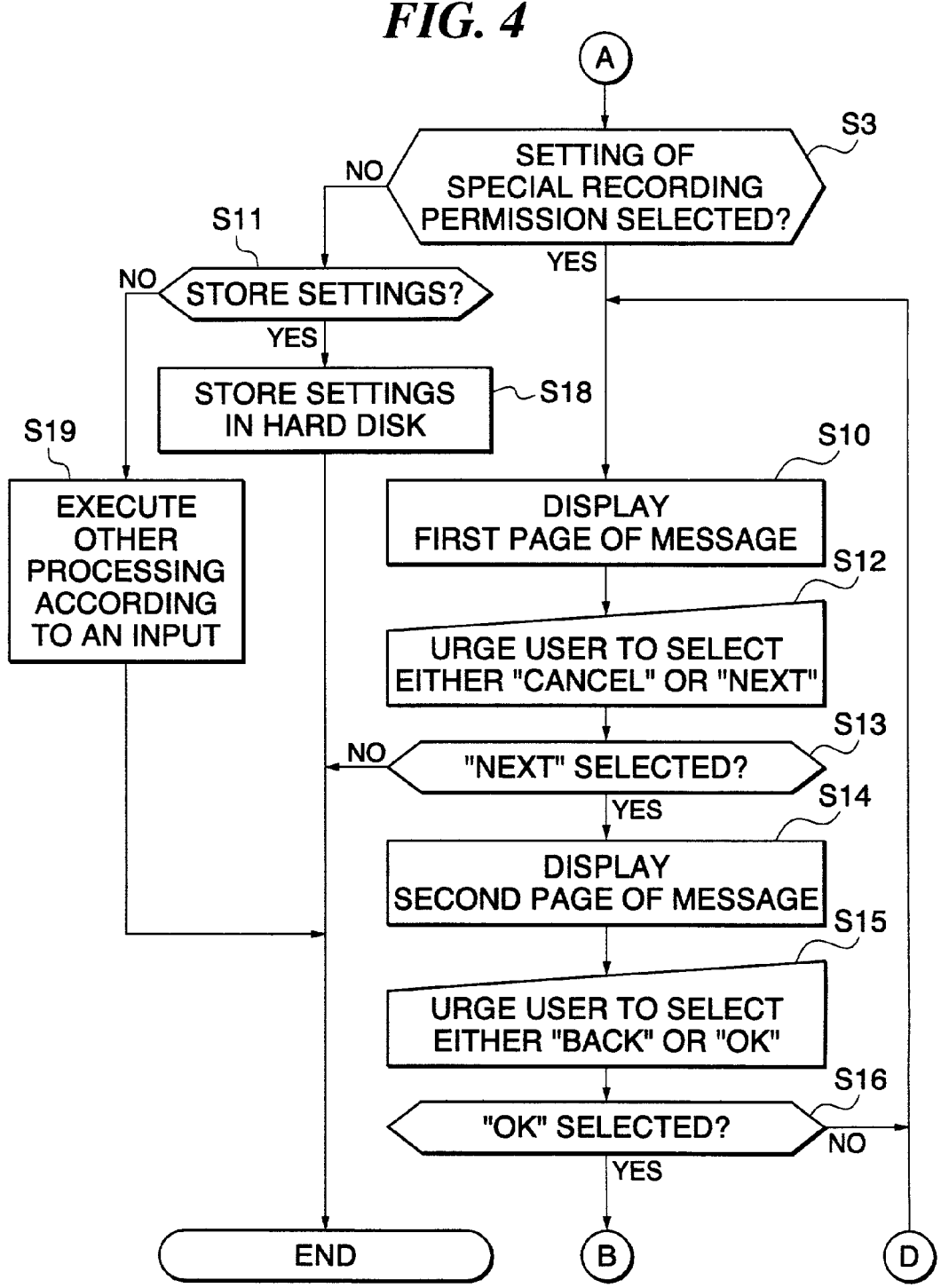
FIG. 4 is a second part (2/3) of the flowchart showing the routine of the panel-setting process.
Figure 5:
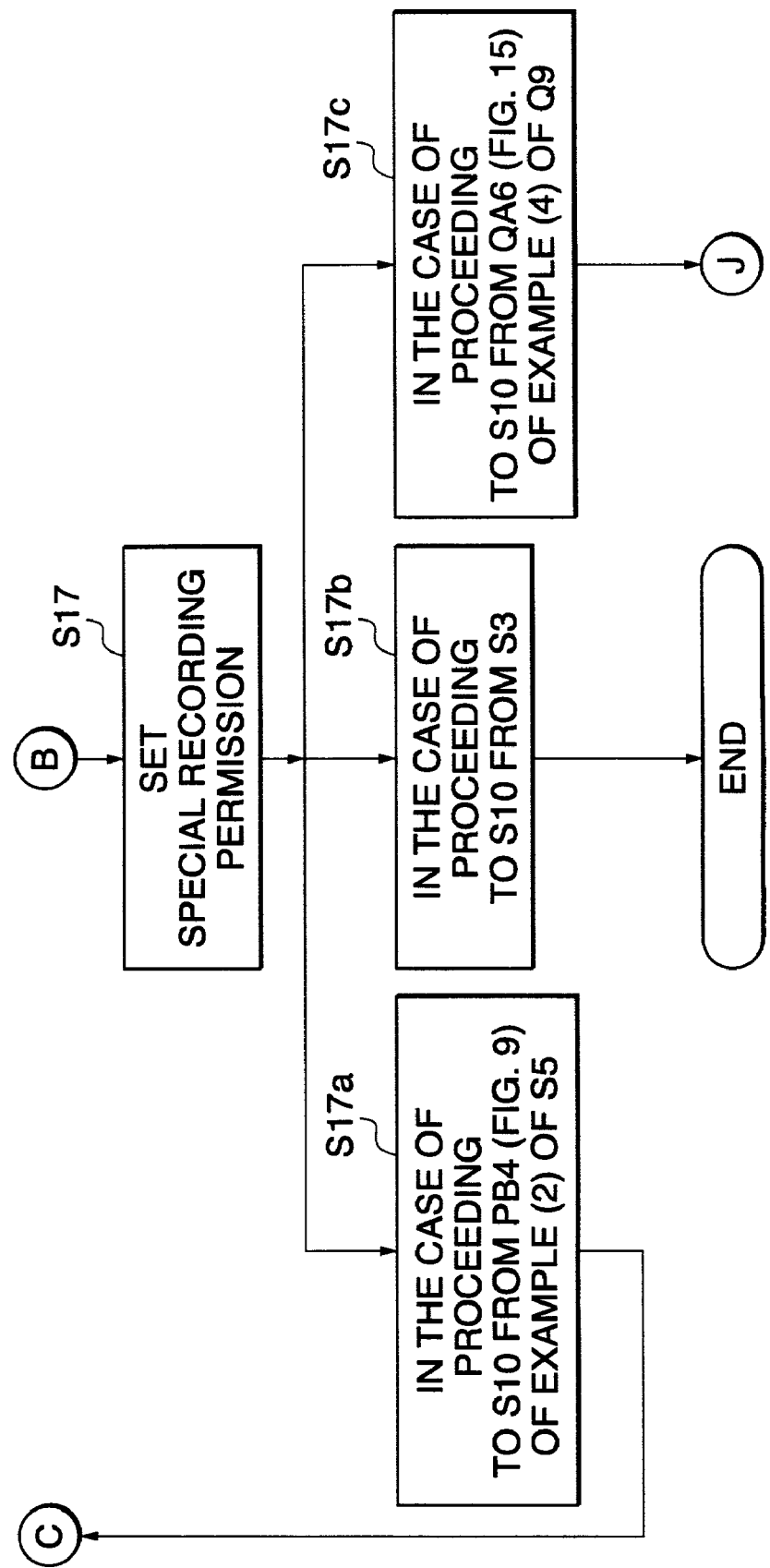
FIG. 5 is a third part (3/3) of the flowchart showing the routine of the panel-setting process.

FIGS. 3 to 5 shows a flow chart of a "panel-setting process" executed by the electronic apparatus according to the present embodiment. This process is started at predetermined time intervals under predetermined conditions during operation of the system, and becomes active when operation of a panel operating element is detected. More specifically, at a first step S1 of the process, it is determined whether or not any one of the operating elements on the panel operating element unit 5 has been operated, and if no operation has been detected, the following steps of the process are skipped to terminate the process, whereas if any one of the operating elements has been operated, the process proceeds to the following steps S2 et seq. for execution of various processes.

Now, a brief description will be given of operations of the electronic apparatus of the present invention with reference to FIGS. 3 to 5. Among a plurality of digital data processes that can be executed by the system, a special recording process (specific process) e.g. for recording data from a compact disk (CD) or the like on a hard disk (HD) [recording process in the case of selection of a first recording mode A (S4→S5), i.e. a CD-to-HD recording process (S6)] is set in advance so as to be restricted from being executed. When an instruction for execution of the special recording (S4→S5→D) or setting of permission of the same (S3) is issued, a message is displayed (S10, S14) for calling the user's attention as to the special recording permission (specific function). If, in response to this message, the user confirms setting of the special recording permission and selects "acknowledgment" (S16), the special recording permission is set (S17). Then, according to the setting of the special recording permission, the limitation of execution of the special recording is canceled, and at the same time, the message-displaying function is inhibited. Further, the state of setting of the special recording permission is recorded in a data recording device (HD) (S18) in response to the user's instruction of storage (S11).

More specifically, first, it is determined at a step S2 whether or not the operating element (5) has been operated so that the display of a screen view for setting basic functions (utilities) associated with the system of the electronic apparatus (which will be also referred to as the utility menu screen, and will be sometimes simply referred to as the "setting screen") is selected. In this electronic apparatus, the setting screen can always be used for reading a "utility menu", from which various kinds of settings including setting of the special recording permission can be carried out. If the display of the setting screen has been selected at the step S2, the process proceeds to a step S3 (see FIG. 4), whereas if not (i.e. if other operation has been carried out), the process proceeds to a step S4.

When the process proceeds to the step S4, it is determined whether or not the first recording mode (A) has been selected. If the first recording made (A) has been selected, a recording screen, not shown, in the first recording mode (A) is displayed on the display 6A, and then processes "confirmation and the like of special recording permission" (FIGS. 8 to 10) and the "CD-to-HD recording process" (see FIGS. 12 and 13) are sequentially performed at the respective steps S5 and S6, followed by terminating the panel-setting process. On the other hand, if the first recording mode (A) has not been selected, the process proceeds to a step S7, wherein it is determined whether or not a second recording mode (B) has been selected. If the second recording mode (B) has been selected, a recording screen, not shown, in the second recording mode (B) is displayed on the display 6A, and then the process proceeds to a step S8, wherein a "CD-R recording process" (FIGS. 17 and 18) is carried out. If neither the first recording mode (A) nor the second recording mode (B) has been selected, the process proceeds to a step S9, wherein a process responsive to an instruction input by operation of another panel operating element is executed. After execution of the step S8 or S9, the panel-setting process is terminated.

When the process proceeds from the step S2 to the step S3, first, it is determined whether or not the user has selected a button for setting the permission of "special recording" (which is preferably made inoperable for selection once the permission of the "special recording" has been set). The term "special recording" is intended throughout the specification to mean recording of digital data (sound data and image data), execution of which is restricted such that duplication of the digital data originally protected by copyright from unauthorized copying is permitted by removal or cancellation of restriction by copyright on the copying thereof, on condition that the data is copied exclusively for the user's private use. If the setting of permission of "special recording" described above is designated for selection, the process proceeds to a step S10, whereas if not, the process proceeds to a step S11.

At the step S10, a first page of the message is displayed on the display 6A, and at the same time a "NEXT" button and a "CANCEL" button are displayed at the bottom of a screen view displaying the first page of the message, for selection. The first page of the message is display as exemplified in FIG. 6 so as to call the user's attention to general matter of copyright concerning the digital data which the system is dealing with. This screen view is configured such that only after one of the buttons is selected by using one or more of the arrow keys (cursor key 58) on the panel operating element unit 5 (or the mouse) and then the "ENTER" key switch 57 is depressed, "NEXT" or "CANCEL" can be determined or selected. Thus, these buttons are provided to urge the user of the electronic apparatus to select "NEXT" or "CANCEL" as shown at the following step S12.

After the "NEXT" button or the "CANCEL" button is selected, it is determined at the following step S13 whether or not the "NEXT" button has been selected by the user. If the "NEXT" button has been selected, the process proceeds to a step S14, whereas if not, i.e. if the "CANCEL" button has been selected, the panel-setting process is terminated.

When the "NEXT" button has been selected, a second page of the message further requesting the user's acknowledgement of precautions is displayed as shown in FIG. 7 at the step S14, and at the same time, buttons for final confirmation of the setting of permission of the special recording (sound recording) (i.e. removal of the restriction (or limitation) of the special recording (sound recording)) are provided at the bottom of the screen such that either "OK" or "BACK" can be selected, as illustrated in FIG. 7, so as to urge the user to select the "OK" or "BACK" button at the following step S15 as shown in the figure. When the user selects the "OK" or "BACK" button by using one or more of the arrow keys (cursor key 58) (or the mouse), and then depresses the "ENTER" key switch 57, it is determined at the following step S16 whether or not the "OK" button has been selected by the user.

If the "OK" button has been selected to conform the setting of the special recording (sound recording) permission, the process proceeds from the step S16 to a step S17, wherein a process for setting the special recording (sound recording) permission is executed. Once the setting of the special recording (sound recording) permission is completed, this setting is maintained until the power of the electronic apparatus is turned off (when the power is turned off, the setting is not preserved), whereby the restriction (or limitation) of the special recording (sound recording) remains cancelled. On the other hand, if "BACK" has been selected, the process returns to the step S10, wherein the preceding screen (the first page of the message) is displayed again on the display 6A, and then the steps S12 to S16 are repeatedly carried out.

If the process proceeds from the step S3, through the steps S10 to S16, to the step S17, wherein the special recording (sound recording) permission is set, the panel-setting process is terminated. However, if the process proceeds from a step PB4 in a second example (2) (FIG. 9), described in detail hereinafter, of the process for "confirmation and the like of the special recording permission" (S5), through the steps S10 to S16, to the step S17, wherein the special recording (sound recording) permission is set, the process proceeds to the step S6 (see FIG. 3). Further, if the process proceeds from a step QA6 in an example (4) (FIGS. 14 and 15), described in detail hereinafter, of a process for "check and the like of special recording permission" (Q9) in the "CD-to-HD recording process" (S6), through the steps S10 to S16, to the step S17, wherein the special recording (sound recording) permission is set, the process proceeds to a step Q10 (see FIG. 13) of the "CD-to-HD recording process" (S6).

Further, when the process proceeds from the step S3 to the step S11, it is determined whether or not "recording (saving) of settings" has been selected by the user. This "recording (saving) of settings" means recording of settings of the electronic apparatus (which are recorded in the RAM 3 as a work storage area) in the hard disk device 12 by operating the panel operating element unit 5. That is, the step S11 is carried out to determine whether or not the settings of the electronic apparatus should be stored in the hard disk device 12, and needless to say, these settings include the setting of "special recording permission" for canceling the restriction or limitation of execution of "special recording (sound recording)" described above.

If it is determined at the step S11 that "recording (saving) of settings" has been selected, the process proceeds to the step S18, wherein the settings made by the user via the panel operating element unit 5 are stored on a hard disk removably mounted in the hard disk device 12 attached to the system of the electronic apparatus. The settings stored in the hard disk device 12 at the present step are used to initialize the electronic apparatus when the system is restarted.

In this case, therefore, when the system is restarted subsequently, the data of settings of the system are read from the hard disk to initialize the system, so that the system can be restored to the same settings. Further, when a different user uses the system and replaces the hard disk with another, different settings of the electronic apparatus can be made. Conversely, after the hard disk having been replaced with a different one, it is impossible to restore the system to the previous settings without using the former hard disk again.

It should be noted that if the user ignores the precautions concerning the acknowledgement of copyright and attempts to start special recording (sound recording) of digital data from the outside without setting the "special recording permission", an error message is displayed, as described hereinafter, and the special recording (sound recording) without permission is inhibited (steps PA1→PA3 in FIG. 8, steps PB1→PB2 in FIG. 9, and steps QA3→QA4 in FIG. 14).

On the other hand, if "recording of settings" has not been selected, the process proceeds from the step S11 to a step S19, wherein a process according to an instruction input by operating another panel operating element is executed. After execution of the step S18 or S19, the panel-setting process is terminated.

[Example of Process of "Confirmation and the Like of Special Recording Permission"]

FIGS. 8 to 10 show a first example (1) to a third example (3), respectively, of the process of the confirmation and the like of special recording permission executed by the electronic apparatus according to the present embodiment. That is, a desired one of the examples (1) to (3) can be applied to the process for "confirmation and the like of special recording permission" executed at the step S5 in FIG. 3.

In the FIG. 8 first example (1), first, it is determined at a first step PA1 whether or not the "special recording (sound recording)" permission has been set. If the special recording (sound recording) permission has been set, the process immediately returns to the FIG. 3 flow with the recording screen in the first recording mode (A) maintained, and proceeds to the "CD-to-HD recording" process at the step S6.

On the other hand, if the special recording (sound recording) permission has not been set, the process proceeds to a step PA2, wherein a selection switch associated with recording (sound recording) processing is displayed in a disabled state (OFF) on the recording screen in the first recording mode (A) on the display 6A. More specifically, the switch button for determining execution of the recording processing is displayed in a gray state in which the user's selection is disabled. Then, at the next step PA3, an error message associated with the special recording (sound recording) permission is displayed at the bottom of the recording screen as follows:

"Data you want to record may be protected against unauthorized duplication. However, if the use of data is limited to your private use, you are allowed to record it by properly setting the system of this electronic apparatus."

Then, at a step PA4, an instruction input by the user for the setting of the special recording permission (i.e. removal of recording restriction) is awaited, followed by the process returning to the step S4 in the "panel-setting process. It should be noted that on the recording screen displayed at the steps PA3, PA4, the user is not allowed to select any of the switch buttons associated with recording processing as described above, but other switch buttons, not shown, including one for setting the special recording permission, are displayed in a state allowing selection by the user.

Referring next to FIG. 9, in this second example (2), it is determined at a first step PB1 whether or not the "special recording (sound recording)" permission has been set. If the special recording (sound recording) permission has been set, similarly to the flow of the FIG. 8 first example (1), the process immediately returns to the FIG. 3 flow with the recording screen in the first recording mode (A) maintained, and proceeds to the "CD-to-HD recording" process at the step S6.

On the other hand, if the special recording (sound recording) permission has not been set, the process proceeds from the step PB1 to a step PB2, wherein an error message associated with the special recording (sound recording) permission is displayed on the display 6A as shown e.g. in FIG. 11. Further, "YES" and "NO" buttons to be selected for determining whether or not the special recording permission (i.e. removal of recording restriction) should be set are displayed in a state allowing user's selection. That is, at a step PB3 of the illustrated example, the user is urged to enter selection concerning the removal of recording restriction.

When either the "YES" button or the "NO" button is selected at the step PB3, it is determined at the following step PB4 whether or not the "YES" button has been selected. If the "YES" button has been selected, the process jumps to the step S10 (FIG. 4), wherein a system-setting screen is displayed on the display 6A, thereby allowing the user to proceed to the steps S12 to S17 to carry out processing for setting the "special recording permission". On the other hand, if the "NO" button has been selected, the process returns from the step PB4 to the step S4 (FIG. 3) in the "panel-setting process".

Finally, in the FIG. 10 third example (3), similarly to the case where the permission of the "special recording (sound recording)" has been set in the FIG. 8 first example (1) or the FIG. 9 second example (2), the process immediately returns to the FIG. 3 flow with the recording screen in the first recording mode (A) maintained, and proceeds to the "CD-to-HD recording" process at the step S6. When the third example (3) is employed, checking as to whether or not the special sound recording permission has been set is not carried out here in the processing flow concerning the confirmation and the like of special recording permission, but carried out in the "CD-to-HD recording" process at the step S6, as described hereinafter.

[Routine for CD-to-HD Recording Process]

Figure 12:
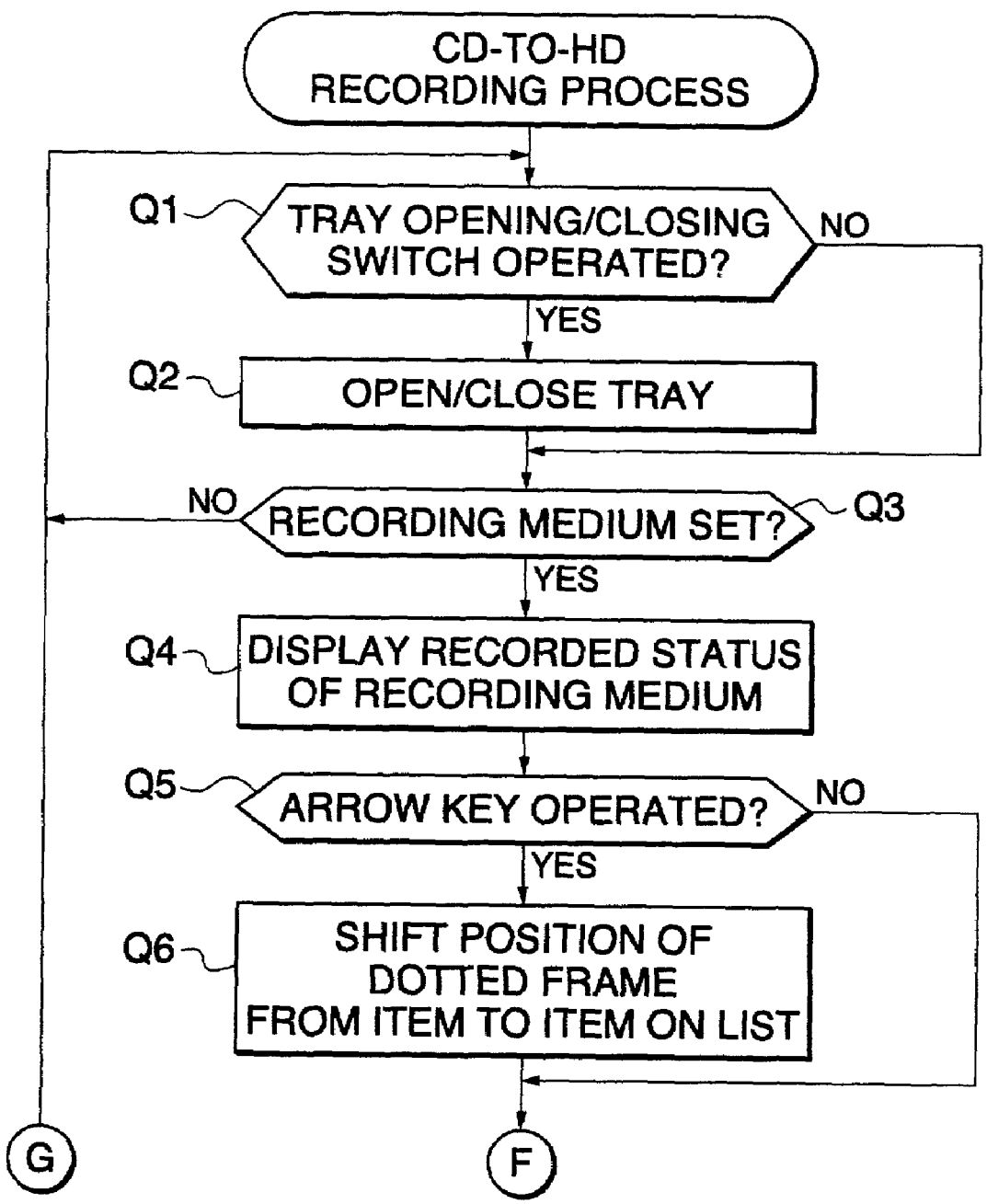
FIG. 12 is a flowchart showing a routine of a CD-to-HD recording process (first recording mode A) which is executed by the FIG. 1 electronic apparatus.
Figure 13:
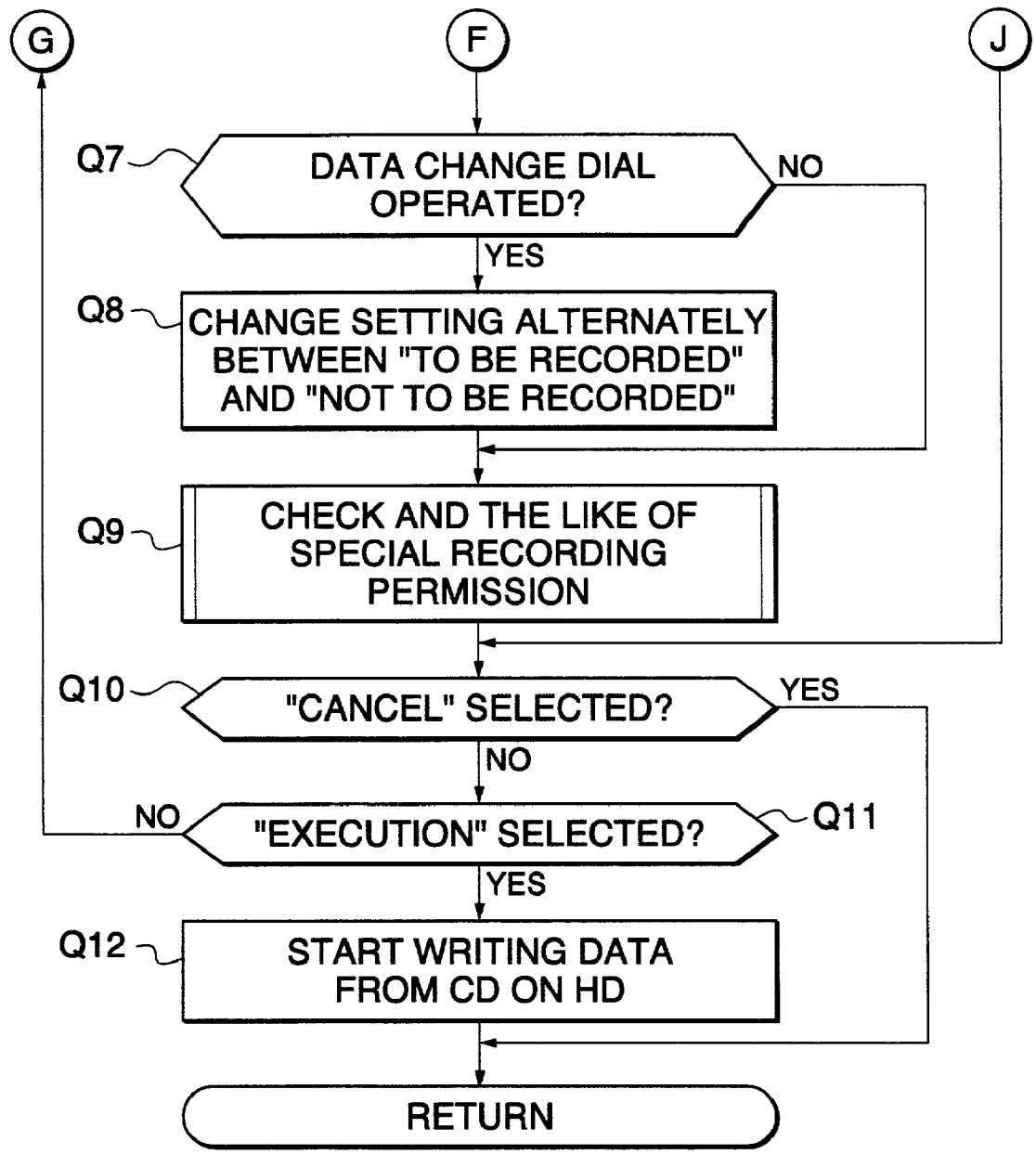
FIG. 13 is a continued part of the FIG. 12 flowchart.

FIGS. 12 and 13 shows a flow chart of the CD-to-HD recording process (in the first recording mode A) executed by the electronic apparatus according to the present embodiment. The illustrated flow of this routine represents the steps of a process for writing or recording digital data from a compact disk (including a CD-R or a CD-RW) or the like set in the internal storage device 4 or the digital apparatus 14 into a hard disk of the hard disk device 12.

At a first step Q1 of the present process, it is determined whether or not a signal is received which is indicative of operation of a tray opening/closing switch of a recording medium drive, such as the internal storage device 4 or the digital source apparatus (player) 14, the operation being effected in order to obtain digital data to be recorded on the hard disk 12, on the recording screen in the first recording mode (A) displayed on the display 6A. If the signal has been received, the tray is opened/closed at a step Q2, and then the process proceeds to a step Q3, whereas if the signal has not been received, the process jumps to the step Q3. The recording media drive whose tray is opened/closed at the step Q2 can be switched between the internal storage device 4 and the digital source apparatus (player) 14 connected to the interface 13, by operating the drive switching switch 51 of the panel operating element unit 5 (on the front panel).

Details of the operation at the step Q2 will now be described. When the opening/closing switch is depressed e.g. in a state of the tray of a designated drive being closed, the tray is opened. If the drive is then in some operation, this operation is forcibly stopped to prevent damage to the drive itself and breakage of a recording medium set in the drive, and then the tray is opened. Further, if the opening/closing switch is depressed when the tray is open, the tray is closed irrespective of whether or not a recording medium is set on the tray.

At the step Q3, it is determined whether or not a recording medium, such as a compact disk, is loaded in the drive. If no recording medium is mounted, the process returns to the step Q1, followed by the steps Q1 (Q2)→Q3 being repeatedly executed until a recording medium is mounted. On the other hand, if a recording medium is mounted, the process proceeds to a step Q4, wherein the recorded state of the recording medium is read out and displayed on the display 6A e.g. as a data recording list as shown in FIG. 2. Although the data recording list exemplified in FIG. 2 shows only the track number of each track where digital music data is recorded and the title of a musical piece represented by the data, the performance time period of each musical piece, the state of an unauthorized duplication-preventing flag, and so forth may be additionally displayed.

At the following step Q5, it is determined whether or not the up arrow or down arrow key of the cursor switch 58 has been depressed. If the up arrow or down arrow key has been depressed, the process proceeds to a step Q7 via a step Q6, whereas if not, the process jumps to the step Q7 (FIG. 13). At the step Q6, the position of a frame FR formed by dotted lines shown in FIG. 2 is shifted vertically with respect to the data recording list on the screen, i.e. upward when the up arrow key has been depressed and downward when the down arrow key has been depressed. By thus shifting the position of the frame FR, it is possible to selectively designate a track as an object for recording operation.

At the step Q7 (FIG. 13), it is determined whether or not a signal has been received which is indicative of operation of the data change dial 59. If the signal has been received, the process proceeds to a step Q9 via a step Q8, whereas if not, the process jumps to the step Q9. At the step Q8, the status of a recording target-setting item (a right-hand side box) indicative of whether or not the track selected or designated by the frame FR should be recorded is changed. For example, in the recording target-setting box, a mark "X" indicative of the status of "not to be recorded" is displayed in advance by default, and when the data change dial 59 is rotatively operated, the box is blanked, i.e. displayed as a "blank" which is indicative of the status of "to be recorded". Then, when the data change dial 59 is further rotated, the box changes to "X" again. Thus, by rotating the data change dial 59 continuously, it is possible to change the status of the recording target-setting item alternately between "X" and "blank".

At the step Q9, a check and the like of special recording permission is performed (as described hereinafter, when the first or second example (1) or (2) is applied to the step S5 for confirmation and the like of the special recording permission, the step Q9 is skipped (example (5)), while when the third example (3) is adopted, a check as to whether or not the special sound recording permission has been set is performed at the step Q9 (example (4))), followed by the process proceeding to a step Q10. At the step Q10, it is determined whether or not a cancel button, not shown, on the recording screen has been selected. If the cancel button has been operated, the CD-to-HD recording process is terminated, whereas if the cancel button has not been operated, the process proceeds to a step Q11.

At the step Q11, it is determined whether or not an "EXECUTION" button, not shown, on the screen or the "EXECUTION" key switch 56 on the front panel has been operated for instruction of execution. If another button, such as a "RESET" button, not shown, has been operated, which means that the instruction of "EXECUTION" has not been issued, the process returns to the step Q1, and then the steps Q1 to Q11 are repeatedly carried out. On the other hand, if the "EXECUTION" button or key switch has been depressed, a track on the hard disk of the hard disk device 12 is designated for recording, and then writing of the data of the track is started for recording digital data selected as data "to be recorded" from the compact disk in the internal storage device 4 or in the digital apparatus 14, onto the designated track on the hard disk. After execution of the step Q12, the CD-to-HD recording process is terminated.

[Example of Process of "Check and the Like of Special Recording Permission"]

Figure 14:
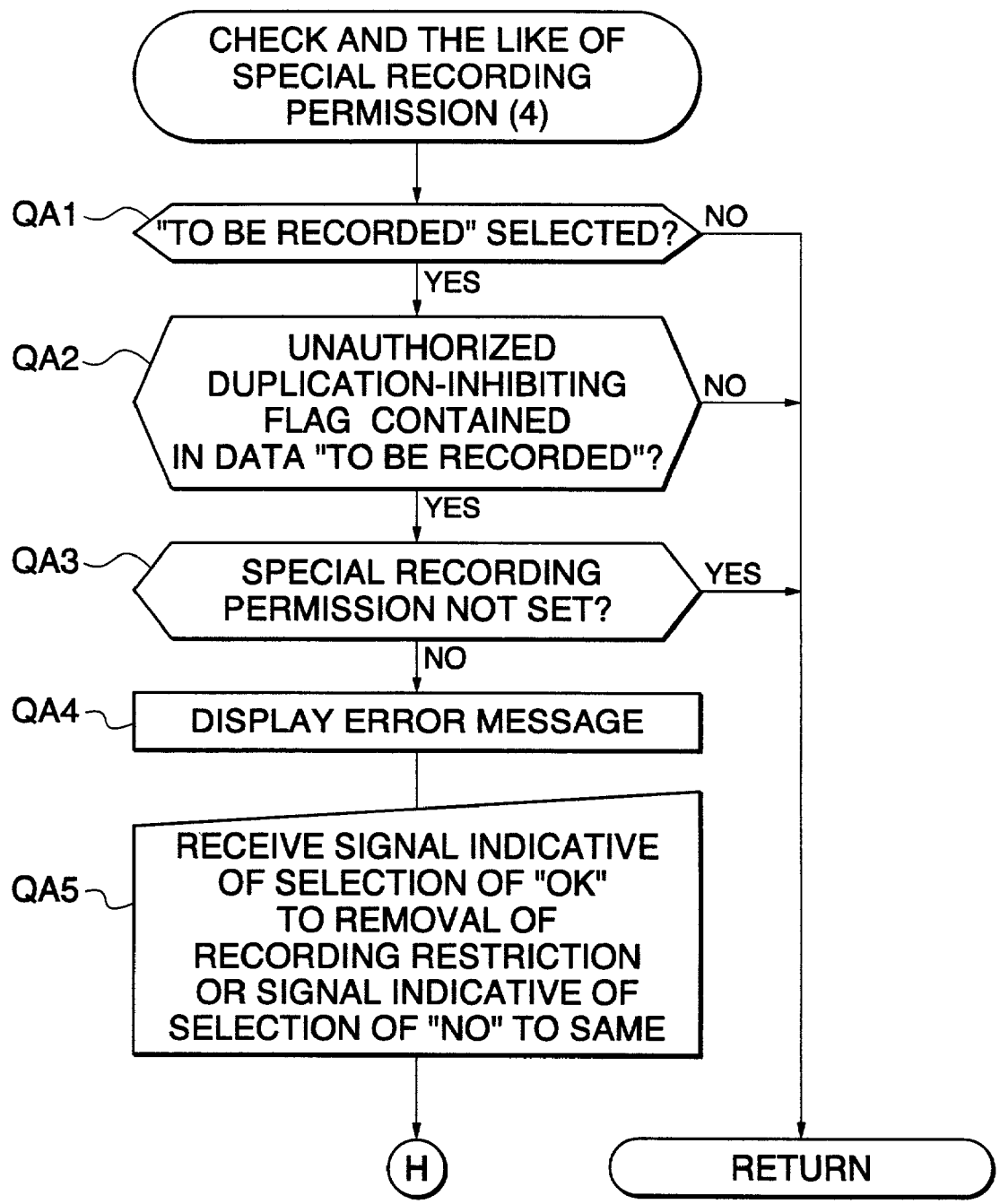
FIG. 14 shows an example (4) (corresponding to a case where the FIG. 10 third example (3) is applied to the process for confirmation and the like of special recording permission) of a flow of a process for a check and the like of special recording permission, which is executed by the FIG. 1 electronic apparatus.
Figure 15:
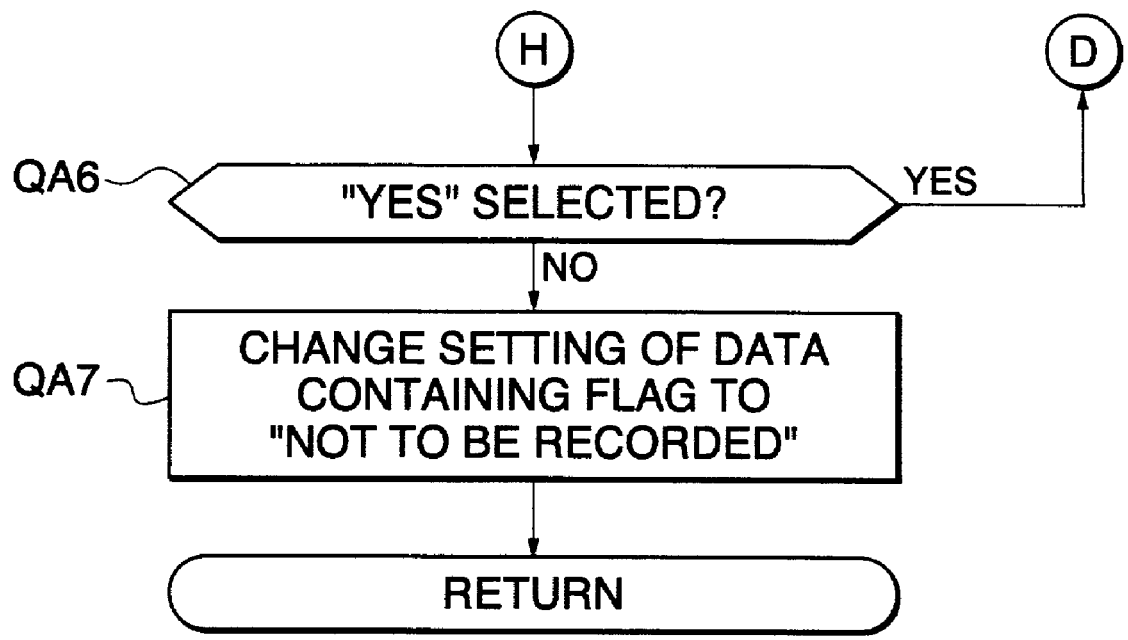
FIG. 15 is a continued part of the FIG. 14 example (4)
Figure 16:
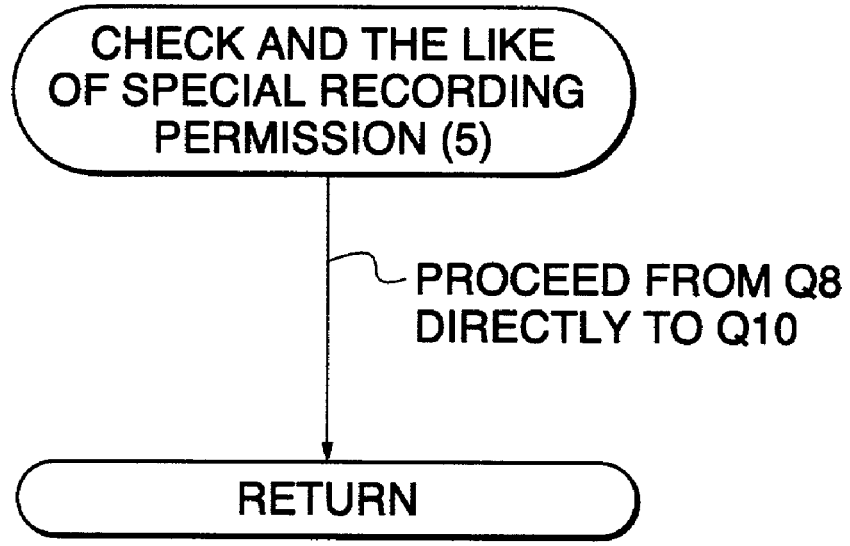
FIG. 16 shows another example (5) (corresponding to a case where the FIG. 8 first example (1) or the FIG. 9 second example (2) is applied to the process for confirmation and the like of special recording permission) of the flow of the process for a check and the like of special recording permission.

FIGS. 14 and 15 show an example (4) of the process of the check and the like of the special recording permission executed by the electronic apparatus according to the present embodiment, and FIG. 16 shows another example (5) of the same. The example (4) is employed in correspondence to the case where the FIG. 10 third example (3) is employed for the confirmation and the like of the special recording permission at the step S5 of the panel-setting process, while the example (5) is employed in correspondence to the case where the FIG. 8 first example (1) or the FIG. 9 example (2) is employed for the same.

In the example (4) of the process of the check and the like of the special recording permission shown in FIGS. 14 and 15, it is determined at a step QA1 whether or not the data recording list displayed on the screen view of the display 6A as shown in FIG. 2 contains data selected as data "to be recorded" (with a blank box on the right-hand side). If data "to be recorded" is contained in the list, the process proceeds to a step QA2, wherein it is determined whether or not the data contains an unauthorized duplication-inhibiting flag. If the inhibiting flag is detected, the process further proceeds to a step QA3.

At the step QA3, it is determined whether or not the "special recording permission" has been set. If the "special recording permission" has not been set, the process proceeds to a step QA4. If the data recording list displayed on the screen contains no data "to be recorded" at the step QA1, or if the inhibiting flag has not been detected at the step QA2, or if the "special recording permission" has already been set at the step QA3, the process immediately returns from a corresponding one of the steps QA1, QA2, and QA3 to the step Q10 for executing the CD-to-HD recording process.

At the step QA4, the error message concerning the special recording permission is displayed on the display 6A as shown in FIG. 11, and further, a "YES" button and a "NO" button for instructing "YES" and "NO", respectively, to setting of the special recording permission (removal of the recording restriction) are displayed in a state allowing user's designating operation. Accordingly, at a step QA5, the system receives a signal indicative of the user's selection as to whether the removal of the recording restriction is to be set.

If either the "YES" button or the "NO" button is selected at the step QA5, it is determined at the following step QA6 (FIG. 15) whether or not the "YES" button has been selected. If the "YES" button has been selected, the process jumps from the step QA6 to the step S10 (FIG. 4) of the "panel-setting process", wherein the system-setting screen view is displayed on the display 6A, whereby the user is allowed to proceed to the process executed at the steps S12 to S17 for setting the "special recording permission". When the setting of the special recording permission (S17 in FIG. 5) using this setting screen is completed, the recording screen displayed previously is displayed again, followed by the process proceeding to the step Q10.

On the other hand, if the "NO" button has been selected, the process proceeds from the step QA6 to a step QA7, wherein the status of "to be recorded" of data in the data recording list on the screen is changed to the status of "not to be recorded" (i.e. the mark "X" is displayed in the right-hand side box), followed by the process returning to the step Q10 of the CD-to-HD recording process.

In the other example (5) of the process of the check and the like of the special recording permission, the confirmation and the like of the special recording permission at the step S5 of the panel-setting process is performed by the function of the FIG. 8 first example (1) or the FIG. 9 second example (2) employed in correspondence to the example (5), so that the process proceeds from the step Q8 directly to the step Q10 as shown in FIG. 16.

[CD-R Recording Process]

Figure 17:
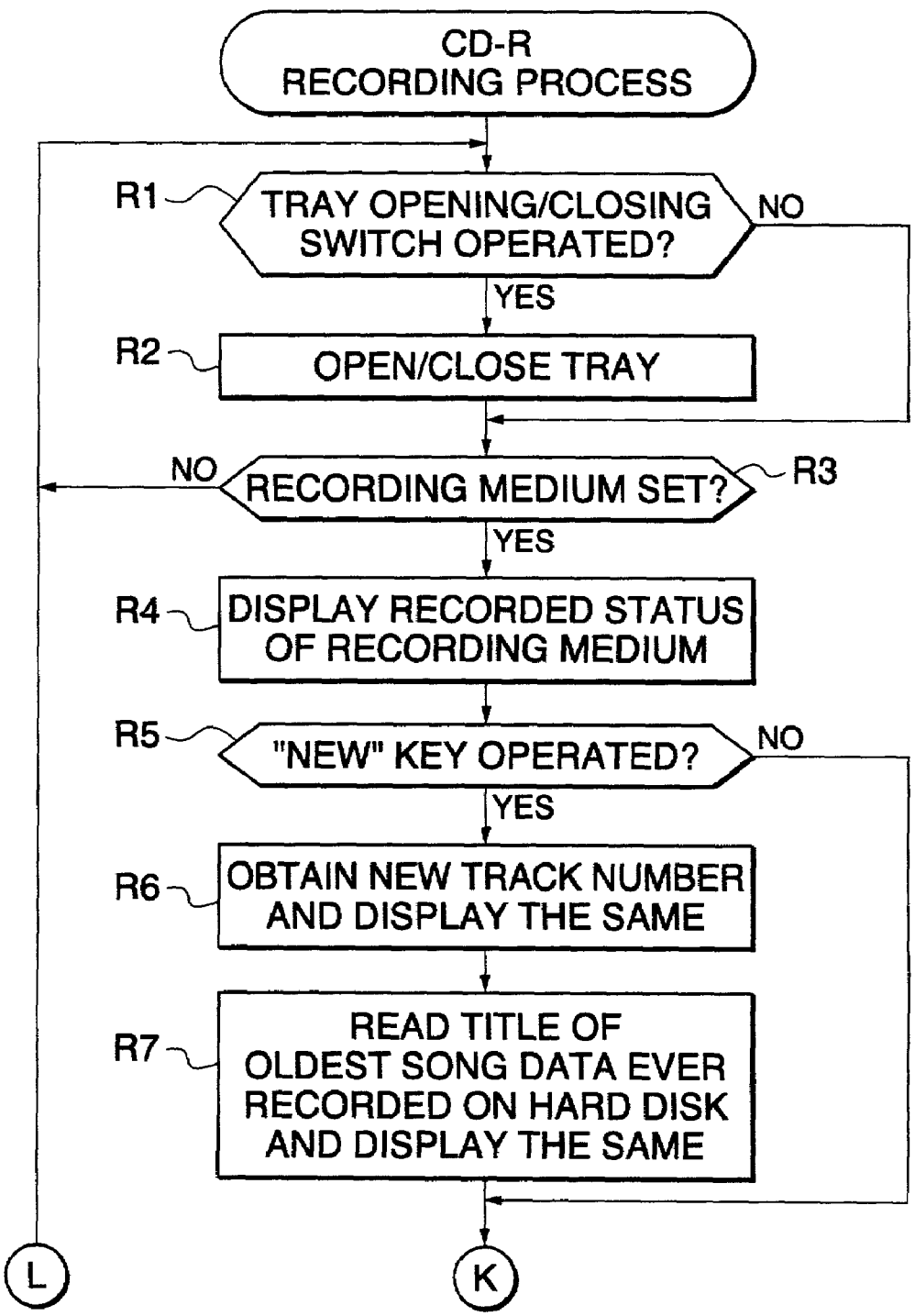
FIG. 17 is a flowchart showing a routine of a CD-R recording process (second recording mode B) which is executed by the FIG. 1 electronic apparatus.
Figure 18:
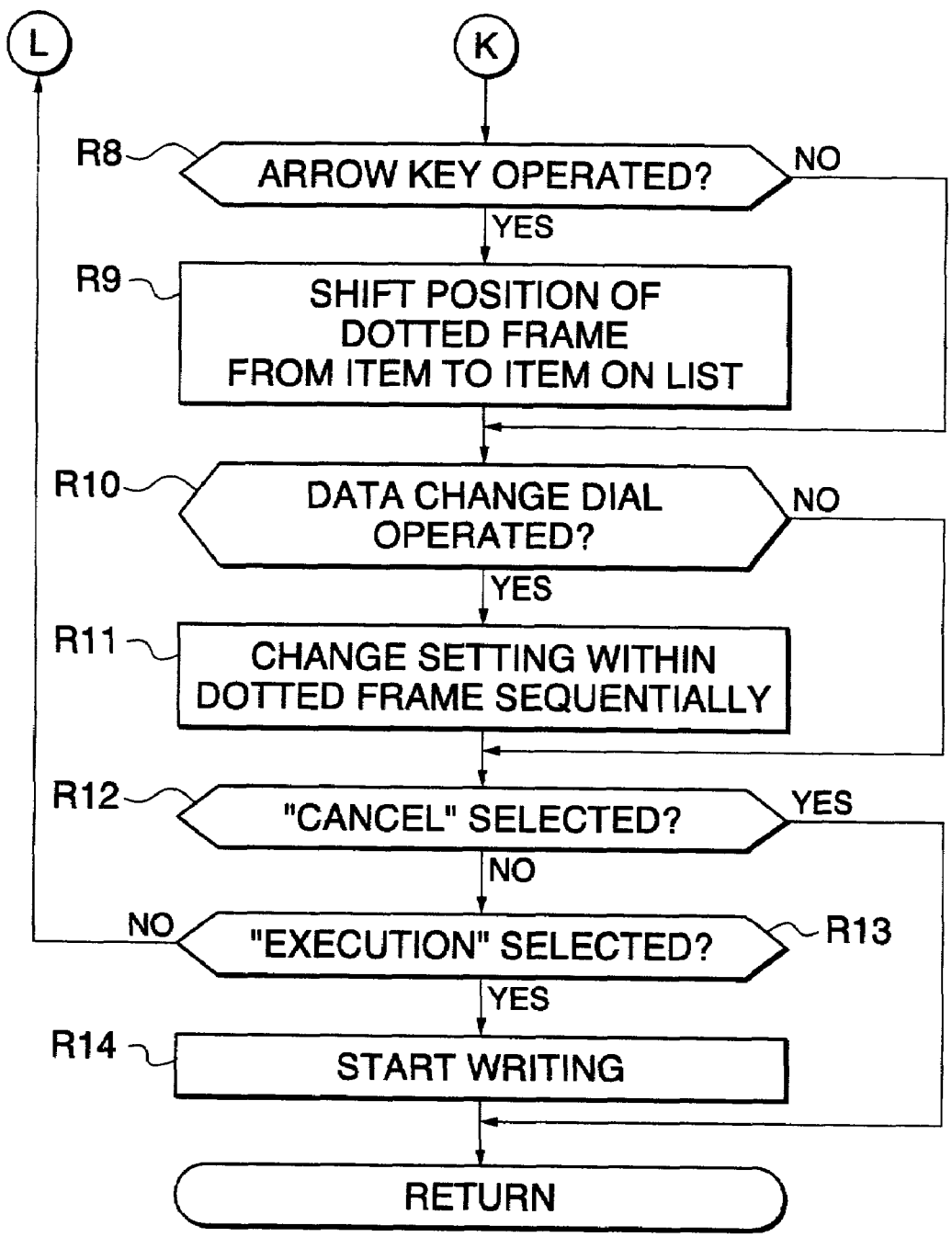
FIG. 18 is a continued part of the FIG. 17 flowchart.

According to the present embodiment, it is possible to store digital data items authorized/unauthorized for copying, on a single compact disk or the like in a mixed manner. FIGS. 17 and 18 show a flow chart of the CD-R recording process (in the second recording mode B) executed by the electronic apparatus according to the present embodiment. The illustrated flow of this routine represents the steps of the panel-setting process executed at the step S8 when a recording medium, such as a recordable compact disk (CD-R) (a CD-R [CD-Recordable], a CD-RW[CD-Rewritable], or the like, represented by the "CD-R" in the present embodiment) is mounted into the internal storage device 4 of the system, and digital data stored e.g. in the hard disk of the hard disk device 12 is written onto the CD recording medium.

At a first step R1 of the present process, it is determined whether or not a signal has been received which is indicative of operation of the tray opening/closing switch for opening/closing the tray of the internal storage device 4 on which a recording medium CD-R for recording digital data is to be mounted. If the signal has been received, the tray is opened/closed at a step R2, and then the process proceeds to a step R3, whereas if the signal has not been received, the process jumps to the step R3. At the step R2, similarly to the step Q2, if the opening/closing switch is depressed e.g. in a state of the tray of the internal storage device 4 being closed, the tray is opened (if the device is then in some operation, the operation is forcibly stopped to prevent damage to the device and the recording medium, and then the tray is opened). Further, if the opening/closing switch is depressed when the tray is open, the tray is closed irrespective of whether or not a recording medium is set on the tray.

Figure 19:
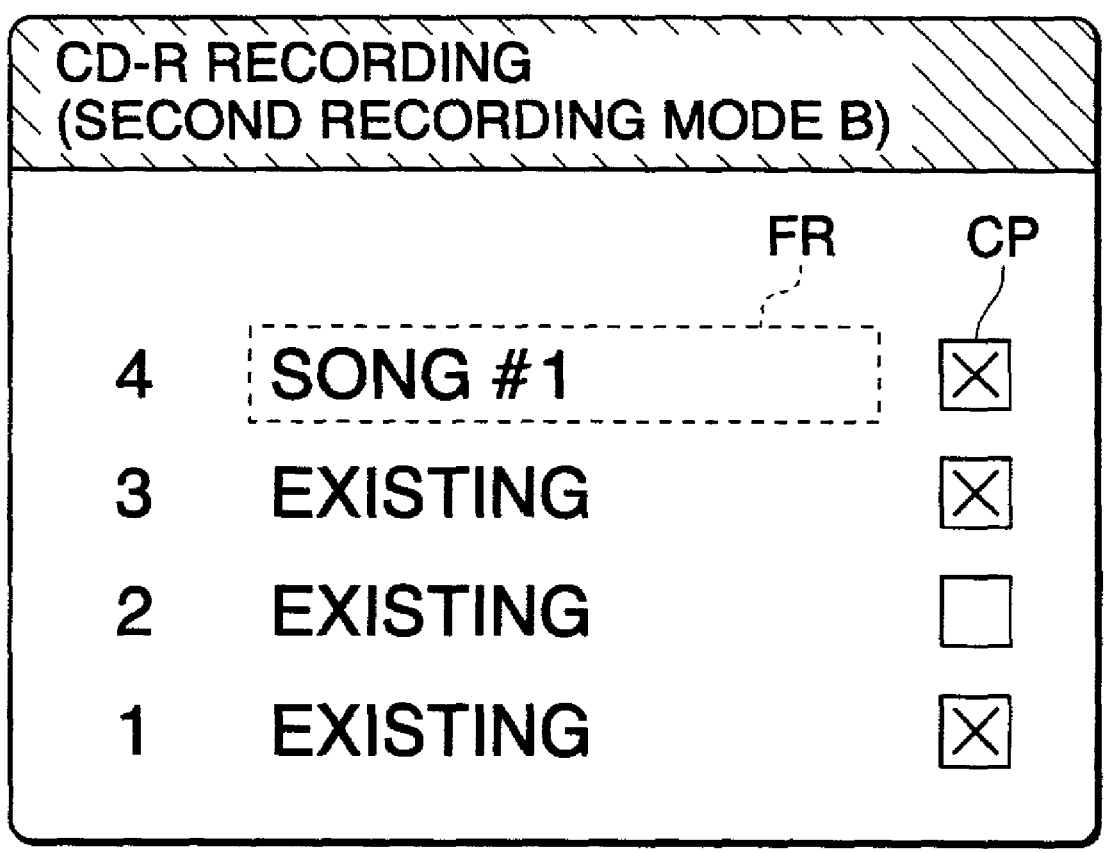
FIG. 19 shows an example of a screen view displayed for the CD-R recording process.

At the step R3, it is determined whether or not a recording medium, such as a compact disk, is mounted in the internal storage device 4. If no recording medium is mounted, the process returns to the step R1, followed by the steps R1 to R3 being repeatedly executed until a recording medium is mounted. On the other hand, if a recording medium is mounted, the process proceeds to a step R4, wherein the recorded status of the recording medium is read out and displayed on the display 6A as a data recording list e.g. as shown in FIG. 19. Although the data recording list exemplified in FIG. 19 enumerates only the track numbers of tracks on each of which digital music data is recorded and existence of the recorded data ("EXISTING", or song name field), the title of each musical piece, a performance time period of the musical piece, a status of recording permission, and so forth may be additionally displayed.

At the following step R5, it is determined whether or not the "NEW" key switch 55 has been operated. If the "NEW" key switch 55 has been operated, steps R6, R7 are sequentially executed, followed by the process proceeding to a step R8 (FIG. 18), whereas if not, the process immediately proceeds to the step R8. If the "NEW" key switch 55 has been operated, first, the smallest track number ("4" in FIG. 19) that has not been stored yet in the recording medium is set and displayed on the display at the step R6. Then, at the step R7, information related to the oldest song among songs recorded on the hard disk of the hard disk device 12 is read out and displayed on the right side of the above selected track number ("SONG #1 in FIG. 19). In this case, it is not necessarily required to select the oldest song, but the oldest one or the newest one of songs that have not been recorded yet on the recording medium may be selected, or alternatively, the selection of a song may be performed in the alphabetical order of song names.

At the step R8, it is determined whether or not any of the arrow keys of the cursor switch 58 has been operated. If any of the arrow keys has been operated, the process proceeds through a step R9 to a step R10, whereas if no arrow key has been operated, the process proceeds directly to the step R10. At the step R9, the position of a frame FR formed by dotted lines is shifted on the screen upward or downward, or leftward or rightward according to the kind of the arrow key which has been operated. By shifting the position of the frame FR vertically, it is possible to select a track to be recorded, and by shifting the position of the frame FR horizontally, it is possible to selectively designate a track number field (left field), a song name field (central field) and a duplication permission-setting field CP (box on a right-hand side) associated with the selected track.

At the step R10, it is determined whether or not a signal has been received which is indicative of operation of the data change dial 59. If the signal has been received, the process proceeds to a step R12 via a step R11, whereas if not, the process proceeds directly to the step R12. At the step R11, the setting of an item selected or designated by the frame FR is changed. In the track number field, for example, the track numbers of available tracks are sequentially displayed one by one. In the song name field, song names are sequentially displayed one by one in descending order in which data of the songs were created. The song names may be displayed in alphabetical order. In the duplication permission-setting field CP, similarly to each recording target-setting item field in FIG. 2, a mark "X" is displayed in advance by default, and by rotation of the data change dial 59, the setting of this field can be alternately changed between "X" and "blank".

Since, as described above, the CD-R recording screen is provided with not only the track number field and the song name field, but also the duplication permission-setting field CP for each of tracks (songs) to be recorded on the compact disk or the like, it is possible to select whether or not a copy bit should be added to each track by making use of the duplication permission-setting field CP. Although the duplication permission-setting field CP is set to "inhibited state" ("X" indicative of addition of a copy bit) by default as described above, the user can change the setting to "permitted state" ("blank") on a song-by-song basis. The setting screen may be set such that once cleared e.g. to move to another screen, it cannot be displayed again or alternatively can be displayed again. Further, when data stored in the hard disk device 12 already contains a signal indicative of the inhibited state ("X"), the signal can be directly used in the field CP as a default value (in the case of data without the signal, the field CP is set to "blank").

At the step R12, it is determined whether or not a "CANCEL" button, not shown, on the recording screen has been selected or operated. If the "CANCEL" button has been operated, the CD-R recording process is terminated, whereas if the "CANCEL" button has not been operated, the process proceeds to a step R13. At the step R13, it is determined whether or not an "EXECUTION" button, not shown, on the screen or the "EXECUTION" key switch 56 has been operated. If not the "EXECUTION" button but another button, such as a "RESET" button, not shown, has been selected, the process returns to the step R1, and then the steps R1 to R13 are repeatedly executed. If the "EXECUTION" button has been depressed, writing of digital data from the hard disk in the hard disk device 12 into the compact disk in the internal storage device 4 is started at the step R13, followed by terminating the CD-R recording process.

The technical object of the above CD-R recording process is to provide a digital data storage apparatus comprised of means for selecting one or more of a plurality of digital data stored in first storage means (hard disk device 12) capable of reading/writing a plurality of digital data (R6 to R7), means for designating the selected digital data for recording on an item-by-item basis or on a group-by-group basis (R9), means for discriminating a recording method (setting of each duplication permission-setting field CP) for each or each group of the designated digital data (R9), and means for storing each or each group of the digital data in second storage means (compact disk or the like in the internal storage device 4) according to the discriminatively set recording method.

In the conventional CD-R recording technique and the like, when a plurality of digital data are to be recorded, permission or inhibition of duplication is set uniformly for all the data, which means that a recording medium is produced which contains only the data recorded by an identical recording method. Therefore, in the conventional technique, it is difficult to deal with a plurality of data differently within a single medium. In contrast, according to the digital data storage apparatus described above, e.g. in writing a plurality of digital data into a CD-R, it is possible to select whether or not a copy bit for inhibiting duplication should be set, for each data to be recorded, so that digital data authorized and unauthorized for copying can be recorded on a single compact disk or the like in a mixed manner. This not only contributes to an increase in the freedom of recording, but also facilitates selection between permission and inhibition of duplication.

Although in the above described embodiment, the present invention has been applied to an electronic apparatus that handles musical data, this is not limitative, but the present invention is also applicable to an electronic apparatus that handles speech data, image data or video data. Further, although in the above embodiment, various messages are displayed on the screens, a method of giving some or all of the messages by voice may be employed.

It goes without saying that the functions of the embodiment described above can be realized in the form of a program as software, whereby the object of the present invention can be attained.

Further, it also goes without saying that the object of the present invention may be accomplished by supplying a storage medium in which is stored a program code of a software program realizing the functions of the above described embodiments to a system or apparatus, and causing a computer (CPU or MPU) of the system or apparatus to read out and execute the program code stored in the storage medium.

In this case, the program code itself read out from the storage medium achieves the novel functions of the above embodiments, and the storage medium storing the program code constitutes the present invention.

The storage medium for supplying the program code to the system or apparatus may be in the form of a floppy disk, a hard disk, an optical memory disk, an magneto-optical disk, a CD-ROM, a CD-R (CD-Recordable), DVD-ROM, a semiconductor memory, a magnetic tape, a nonvolatile memory card, or a ROM, for instance. Further, the program code may be supplied from a server computer via a MIDI apparatus or a communication network.

Further, needless to say, not only the functions of the above embodiments can be realized by executing the program code read out by the computer but also an OS (operating system) or the like operating on the computer may execute part or whole of actual processing in response to instructions of the program code, thereby making it possible to implement the functions of the above embodiments.

Furthermore, it goes without saying that after the program code read out from the storage medium has been written to a memory incorporated in a function extension board inserted in the computer or in a function extension unit connected to the computer, a CPU or the like arranged in the function extension board or the function extension unit may execute part or whole of actual processing in response to the instructions of the program code, thereby making it possible to achieve the functions of the above embodiments.

The above described embodiments are given only by way of example, and various changes and modifications thereto may be made without departing from the spirit and scope of the present invention.

What is claimed is:

1. An electronic apparatus for performing a plurality of processes on digital data, said plurality of processes including a specific process, the execution of which is restricted in advance, comprising:
   a data storage device that stores digital data, said data storage device capable of storing digital audio data or digital image data taken in from a source outside of the electronic apparatus in accordance with the specific process;
   a setting information storage device that can be mounted with a removable recording medium and stores information indicative of a setting of a set specific function in the removable recording medium;
   a recording section for storing the information in the mounted removable recording medium;
   a notification section that notifies a user of a message calling the user's attention to the presence of copyright protection for digital data subjected to the specific process in response to an instruction issued on the specific process;
   a function-setting section that sets a specific function for removing restriction on the execution of the specific process when the user indicates an acceptance to the contents of the message, notifies the user of a warning message informing the user that the copying of the digital data is permitted solely for personal use, and records information indicative of the setting of the set specific function to the mounted removable recording medium, said function-setting section sets the specific function upon the user inputting an instruction for setting the specific function;
   an execution restriction-removal section that removes the restriction on the execution of the specific process and stops the function of said notification section, based on the information indicative of the setting of the set specific function; and
   an inhibiting section that inhibits said notification section from notifying the user of the message upon the user's acceptance to the contents of the message.

2. An electronic apparatus according to claim 1, wherein said notification section notifies the user of the message, in dependence on whether unauthorized duplication of digital data on which the specific process is to be carried out is inhibited.

3. An electronic apparatus according to claim 1, wherein said notification section displays a message concerning a copyright on a screen or notifies the message by voice, in response to an instruction for executing the specific process or an instruction for setting the specific function.

4. An electronic apparatus according to claim 1, wherein said recording section stores the information indicative of the setting of the specific function in the storage device, in response to an instruction for storing the information.

5. An electronic apparatus according to claim 1, wherein said setting information storage device and said data storage device are an identical storage device that can be replaced.

6. A data recording method for an electronic apparatus for performing a plurality of processes on digital data, said plurality of processes including a specific process, the execution of which is restricted in advance, the data recording method comprising steps of:
   providing a data storage device that stores digital data, said data storage device capable of storing digital audio data or digital image data taken in from a source outside of the electronic apparatus in accordance with the specific process;
   receiving the mounting of a removable recording medium;
   storing information indicative of a setting of a set specific function in the removable recording medium;
   notifying a user of a message calling the user's attention to the presence of a copyright protection for the digital data subjected to the specific process in response to an instruction issued on the specific process;
   setting a specific function for removing restriction on the execution of the specific process when the user agrees to the contents of the message;
   notifying the user of a warning message informing the user that the copying of the digital data is permitted solely for personal use;
   recording, to the mounted removable recording medium, information indicative of the setting of the set specific function;
   removing the restriction on the execution of the specific process and stopping the function of the notification section, based on the information indicative of the setting of the set specific function, said step of removing occurs upon receiving from the user an instruction for setting the specific function; and
   inhibiting the notification of the message once the user agrees to the contents of the message.

7. A computer-readable storage medium storing a program for executing data recording method for an electronic apparatus for performing a plurality of processes including a specific process, the execution of which is restricted in advance, the program comprising:
   a data input module that causes the electronic apparatus to store one of digital audio data or digital image data taken in from a source outside of the electronic apparatus in accordance with the specific process;
   a detection module for detecting a mounting of a removable recording medium;
   a storing module for storing information indicative of a setting of a set specific function in the removable recording medium;
   a notifying module that notifies a user of a message calling the user's attention to the presence of a copyright protection for the digital data subjected to the specific process in response to an instruction issued on the specific process;
   a specific function-setting module that sets a specific function for removing restriction on the execution of the specific process when the user indicates an acceptance to the contents of the message;
   a recording module that records, to the mounted removable recording medium, information indicative of the setting of the set specific function;
   an execution restriction-removing module that removes the restriction on the execution of the specific process, notifies the user of a warning message informing the user that the copying of the digital data is permitted solely for personal use, and disables said notifying module, based on the information indicative of the setting of the set specific function, wherein the restriction is removed upon receiving from the user an instruction for setting the specific function; and
   an inhibiting module that inhibits said notification module from notifying the user of the message once upon the user's acceptance to the contents of the message.

* * * * *